United States Patent
Goguen et al.

(10) Patent No.: US 8,134,921 B2
(45) Date of Patent: Mar. 13, 2012

(54) CMTS UPSTREAM CHANNEL BANDWIDTH SCHEDULER

(75) Inventors: Robert Goguen, Acton, MA (US); De Fu Li, Wayland, MA (US); Pawel Sowinski, Northborough, MA (US); Nicos Achilleoudis, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 492 days.

(21) Appl. No.: 12/060,824

(22) Filed: Apr. 1, 2008

(65) Prior Publication Data
US 2009/0249417 A1    Oct. 1, 2009

(51) Int. Cl.
*H04J 3/16*    (2006.01)
(52) U.S. Cl. ........................ 370/230; 370/468
(58) Field of Classification Search .......... 370/229–235, 370/464, 465, 468
See application file for complete search history.

(56) References Cited

U.S. PATENT DOCUMENTS

| | | | |
|---|---|---|---|
| 6,341,303 B1 * | 1/2002 | Rhee et al. | 718/104 |
| 6,529,520 B1 * | 3/2003 | Lee et al. | 370/468 |
| 2008/0095071 A1 * | 4/2008 | Lu et al. | 370/254 |
| 2008/0137597 A1 * | 6/2008 | Lu | 370/329 |
| 2008/0228878 A1 * | 9/2008 | Wu et al. | 709/205 |
| 2008/0268855 A1 * | 10/2008 | Hanuni et al. | 455/445 |

OTHER PUBLICATIONS

Cablelabs, Data-Over-Cable Service Interface Specifications DOCSIS 3.0 Security Specification, c 2006-2007, Cable Television Laboratories, Inc., http://www.cablemodem.com/specifications/specifications30.html.

* cited by examiner

*Primary Examiner* — Aung S Moe
*Assistant Examiner* — Kerri Rose
(74) *Attorney, Agent, or Firm* — Stolowitz Ford Cowger LLP

(57) ABSTRACT

In one embodiment, a Cable Modem Termination System (CMTS) generates a bandwidth grant message corresponding to a time segment. The CMTS identifies a portion of the time segment to be assigned according to received bandwidth request messages originating from downstream cable modems. The CMTS determines whether a remaining portion of the time segment can accommodate more than N broadcast contention slots, and if so, selects at least one of the cable modems for receiving an upstream bandwidth boost.

19 Claims, 3 Drawing Sheets

CMTS UPSTREAM CHANNEL BANDWIDTH SCHEDULER

TECHNICAL FIELD

The present disclosure relates generally to the field of cable networks.

BACKGROUND

Cable operators have widely deployed high-speed data services on cable television systems. These data services allow subscriber-side devices, such as personal computers, to communicate over an ordinary cable TV network Hybrid Fiber Coax (HFC) cable. A Cable Modem Termination System (CMTS) connects the cable TV network to a data network, such as the Internet. The Data Over Cable Service Interface Specification (DOCSIS) is one of the cable modem standards used for transferring data over the cable TV network.

DOCSIS specifies that the cable modems obtain upstream bandwidth according to a request/grant scheme. A cable modem sends a bandwidth allocation request when subscriber devices need to send traffic upstream into the cable network. The CMTS grants these requests using bandwidth grant MAP messages. Under certain circumstances, upstream transmissions from the cable modems can be bottlenecked by upstream bandwidth limitations. The disclosure that follows solves this and other problems.

DESCRIPTION OF EXAMPLE EMBODIMENTS

Overview

Figure 1:
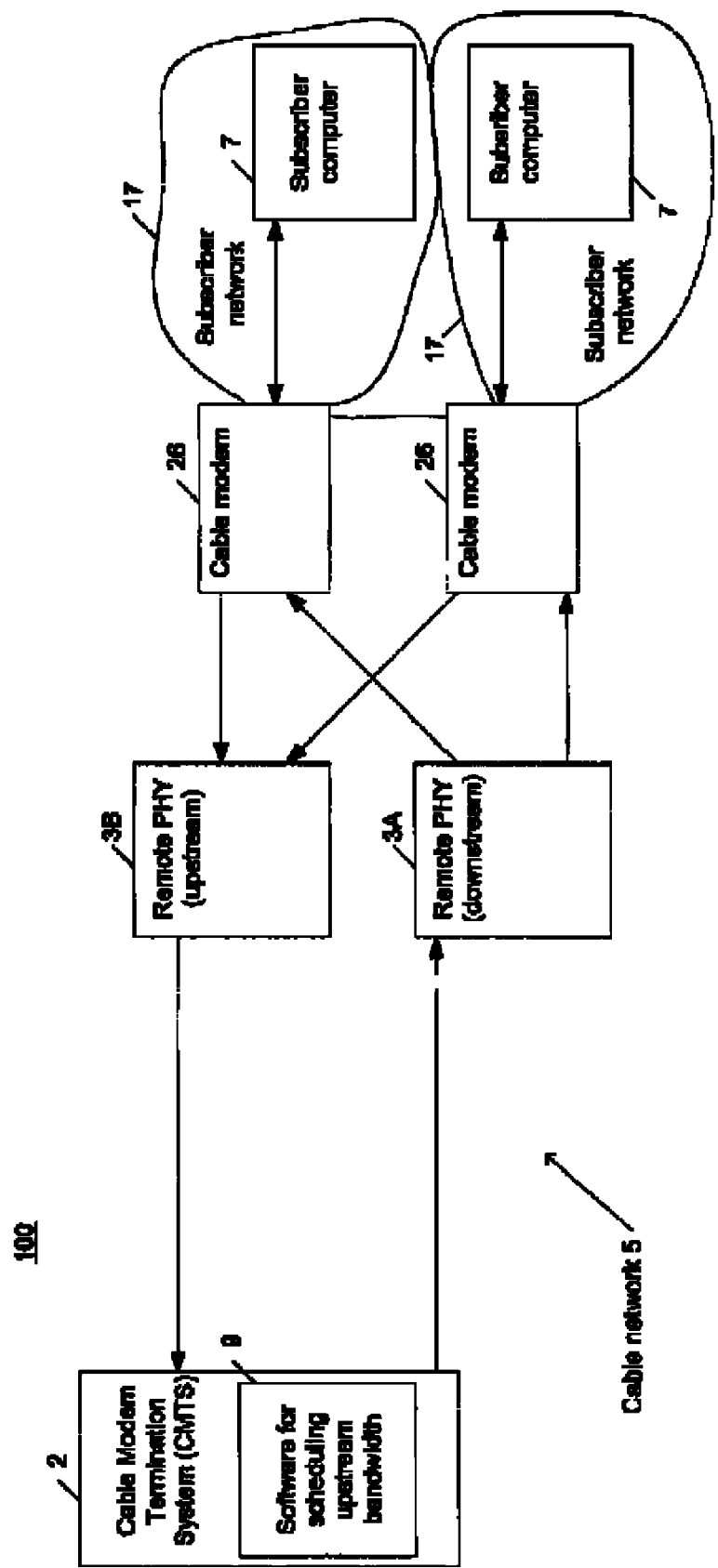
FIG. 1 illustrates an example system for scheduling unsolicited upstream bandwidth in a cable network.

In one embodiment, a Cable Modem Termination System (CMTS) generates a bandwidth grant message corresponding to a time segment. The CMTS identifies a portion of the time segment to be assigned according to received bandwidth request messages originating from downstream cable modems. The CMTS determines whether a remaining portion of the time segment can accommodate more than N broadcast contention slots, and if so, selects at least one of the cable modems for receiving an upstream bandwidth boost.

Description

Several preferred examples of the present application will now be described with reference to the accompanying drawings. Various other examples of the invention are also possible and practical. This application may be exemplified in many different forms and should not be construed as being limited to the examples set forth herein.

The figures listed above illustrate preferred examples of the application and the operation of such examples. In the figures, the size of the boxes is not intended to represent the size of the various physical components. Where the same element appears in multiple figures, the same reference numeral is used to denote the element in all of the figures where it appears. When two elements operate differently, different reference numerals are used regardless of whether the two elements are the same class of network device. Only those parts of the various units are shown and described which are necessary to convey an understanding of the examples to those skilled in the art.

FIG. 1 illustrates an example system for scheduling unsolicited upstream bandwidth in a cable network.

The example system 100 includes a Cable Modem Termination System (CMTS) 2 having software 9 for scheduling upstream bandwidth. The example system also includes a downstream PHY 3A, an upstream PHY 3B, and a plurality of cable modems 26 providing the subscriber computers 7 and subscriber networks 17 access to the cable network 5.

According to an example scheme that will be explained later in greater detail, the CMTS 2 can target certain ones of the downstream cable modems 26 for receiving an upstream bandwidth boost. The software 9 identifies bandwidth that has not been requested by any downstream cable modems 26; bandwidth that DOCSIS standards allocate for bandwidth contention requests. The CMTS 2 then grants the targeted ones of the cable modems 26 any bandwidth they have requested as well as an additional, unsolicited portion taken from the identified bandwidth. The targeted ones of the cable modems 26 can use this unsolicited bandwidth to increase upstream throughput.

The example scheme performed by the software 9 is interoperable with existing network infrastructure, including existing cable modems. Accordingly, cable operators can provide improved upstream bandwidth rates for certain customers without installing new hardware at the customer premises, and without modifying existing cable modems.

Figure 2:
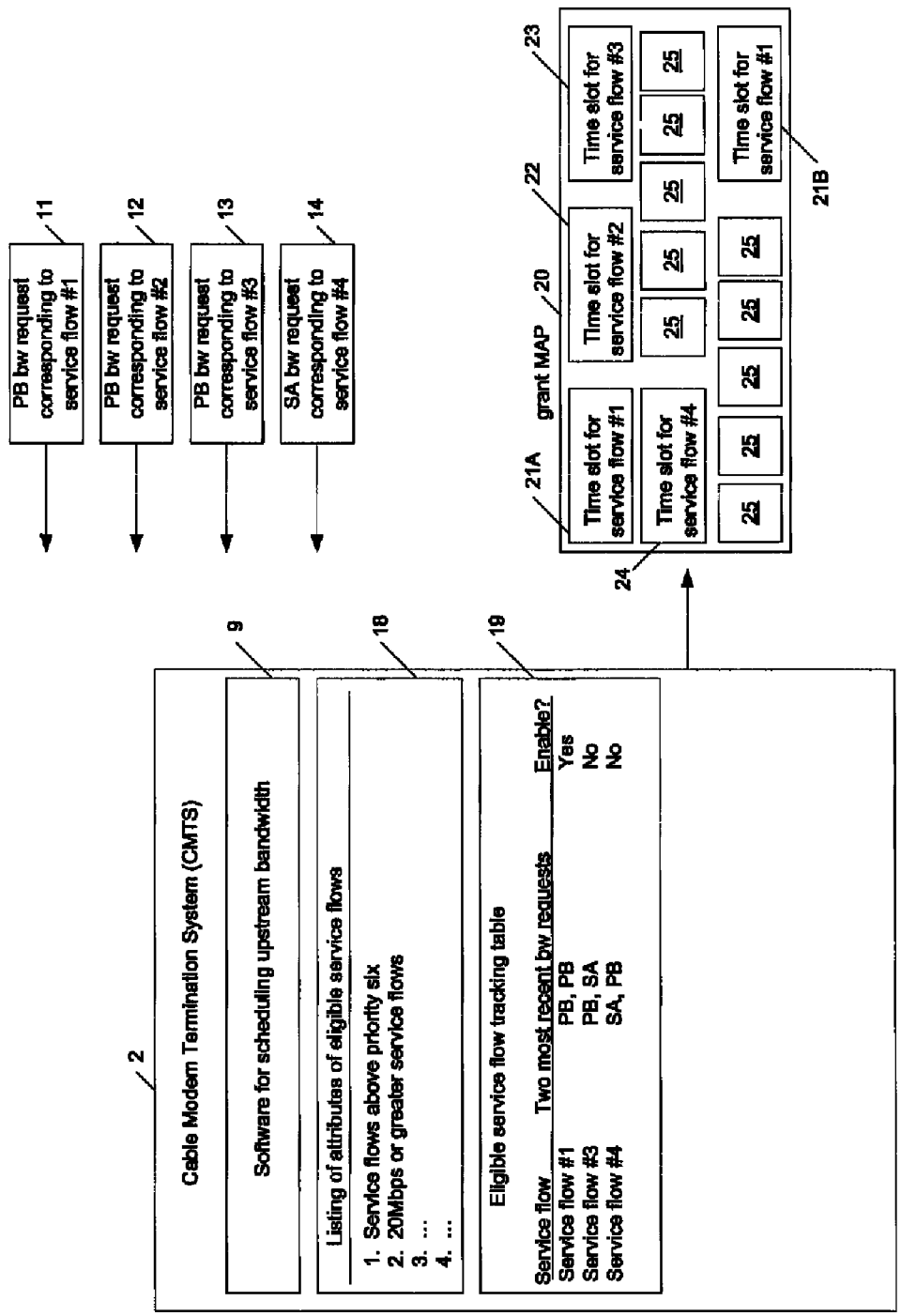
FIG. 2 illustrates one example of how the Cable Modem Termination System (CMTS) shown in FIG. 1 schedules unsolicited upstream bandwidth.

FIG. 2 illustrates one example of how the Cable Modem Termination System (CMTS) shown in FIG. 1 schedules unsolicited upstream bandwidth.

In the present example, the CMTS 2 targets a subset of downstream cable modems to provide the identified bandwidth. Limiting the amount of cable modems accessing the pool of identified bandwidth is preferable, particularly when the number of downstream cable modems is relatively high in comparison to the amount of identified bandwidth, to prevent diluting the effects of allocating additional bandwidth. The CMTS 2 selects which ones of the downstream modems are to receive the additional bandwidth using both the listing 18 and the tracking table 19. In other examples, the CMTS 2 may select downstream cable modems using only one of the listing 18 and the table 19, or neither. The listing 18 and the table 19 may be integrated into a single database and are shown separately for illustrative purposes.

The listing 18 stores a user policy indicating attributes of preferred service flows to be tracked. When a service flow is activated, the software 9 compares attributes of the activated service flow to attributes included in the listing 18. Only those activated service flows having at least one of the attributes listed in the listing 18 are added to the tracking table 19. Such filtering optimizes resources by tracking only those service flows that are eligible for the bandwidth increases according to the user policy. This allows a cable service provider to specify certain premium accounts to be eligible additional bandwidth boosts, while other standard accounts are not. In the present example, the listing 18 indicates example attributes relating to priority and maximum transfer rate; however, any types of attributes can be included in the listing 18.

The tracking table 19 tracks only those service flows eligible for additional bandwidth according to the user policy. In the present example, service flows #1, #3, and #4 are tracked in the table 19, while service flow #2 is not. For those tracked service flows, the table 19 stores information about the two most recently received bandwidth requests for each of the tracked flows. The software 9 then formats the tracking table 19 to indicate whether additional bandwidth is enabled according to this history of bandwidth request information.

In the present example, the table 19 indicates the type of the two most recently received bandwidth requests. Under DOCSIS, bandwidth requests are typically Stand Alone (SA) type bandwidth requests sent by a cable modem during a bandwidth contention slot indicated in a MAP message. However, to preserve bandwidth a cable modem may also send a Piggy-Back (PB) type bandwidth request, which is a bandwidth request inside a non-bandwidth-request packet. Such PB bandwidth requests may be included in the payload of a data packet destined to an endpoint other than the CMTS. Such a data packet includes a header indicating to the CMTS that a bandwidth request is included in the data packet's payload. The types of bandwidth requests are tracked in the table 19, and when the two most recently received bandwidth requests are PB type bandwidth requests, additional bandwidth is enabled for the corresponding service flow. For example, after bandwidth requests 11-14 are received, the most recently received fields and the enable fields of the table 19 are updated such that tracked service flow #1 is enabled for a bandwidth boost and tracked service flows #3 and #4 are disabled for a bandwidth boost.

The CMTS 2 generates grant MAPs for distribution to downstream cable modems at intervals, which typically occur about every two milliseconds. By way of background on DOCSIS, grant MAPs use a time division scheme whereby certain time slots are assigned for use by cable modems in transmitting upstream traffic. These time slots are allocated by a CMTS according to bandwidth requests sent by the cable modems. DOCSIS specifies that gaps in the grant MAP that are not filled with the assigned time slots are assigned as broadcast contention slots, which are not assigned to a particular cable modem.

When the CMTS 2 generates a grant MAP, the software 9 determines the number of broadcast contention slots to be included in the generated grant MAP. If the number of broadcast contention slots is greater than a predefined number, the software 9 uses the table to identify service flows enabled for additional bandwidth. Thereafter, the software 9 fills the gaps in the generated grant MAP up to the predetermined number of broadcast contention slots, and any remaining gaps in the generated grant MAP are filled with additional time slots for the enabled service flows from the table 19.

To illustrate the above process, the FIG. 2 shows the example grant MAP 20. The grant MAP 20 includes time slots 21A, 22, 23, and 24 allocated according to the bandwidth requests 11-14. The remaining time gaps in the grant MAP 20 are allocated with both broadcast contention slots 25 up to a predetermined number (ten in this example) and an additional unsolicited time slot 21B for the enabled service flow #1 identified in the table 19. It has been empirically shown that ten broadcast contention slots are preferable for the predefined number of broadcast contention slots in many scenarios. In other scenarios, however, the software 9 can be configured to include a different predetermined number of broadcast contention slots before allocating remaining time gaps for a bandwidth boost. Since DOCSIS defines a maximum amount for each time slot allocated to a particular cable modem, it should be apparent there may be more than one additional unsolicited time slot allocated for a same modem if the remaining time gap after including the ten broadcast contention slots 25 is relatively large.

When the cable modem corresponding to service flow #1 receives the grant MAP 20, the cable modem will transmit upstream traffic during both the requested time slot 21A and the additional, unsolicited time slot 21B. Since the DOCSIS standard limits the amount of bandwidth a cable modem can request in a single bandwidth request, and since there is approximately a 4 millisecond turn around for a cable modem to receive a grant MAP after sending a bandwidth request, it should be apparent that the cable modem corresponding to service flow #1 will receive a boost in upstream throughput when compared to a cable modem operating without a CMTS having the software 9. It has been empirically shown that cable modems downstream from the CMTS 2 having software 9 may experience a twenty percent improvement, or more, in real world upstream transmit rates due to operation of the software 9 on the CMTS 2.

It should be apparent that numerous variations can be made to the example software 9 described above while still applying the principles described herein. For example, an alternative CMTS may not include the listing 18 or the table 19. Such an alternate CMTS could allocate time gaps remaining after allocating broadcast contention slots amongst all downstream cable modems. Also, alternate designs do not necessarily need to use a fixed, predetermined number of broadcast contention slots in every generated MAP. Instead, the number of broadcast contention slots included before allocating remaining gaps to additional unsolicited bandwidth time slots may vary according to monitored traffic or other variables such as time of day.

Also, it should be apparent that alternative designs of the CMTS may include the tracking table 19, but may enable tracked service flows according to other variables besides the type of most recently received bandwidth requests. For example, an alternative CMTS may enable tracked service flows when a threshold number of bandwidth requests are received over a certain amount of time, independently of what type of bandwidth requests the cable modem is sending. Or, an alternative CMTS may enable tracked service flows when a corresponding cable modem maxes out the amount of bandwidth requested in a predefined number of consecutive bandwidth requests. Other variations are also practical and possible.

Figure 3:
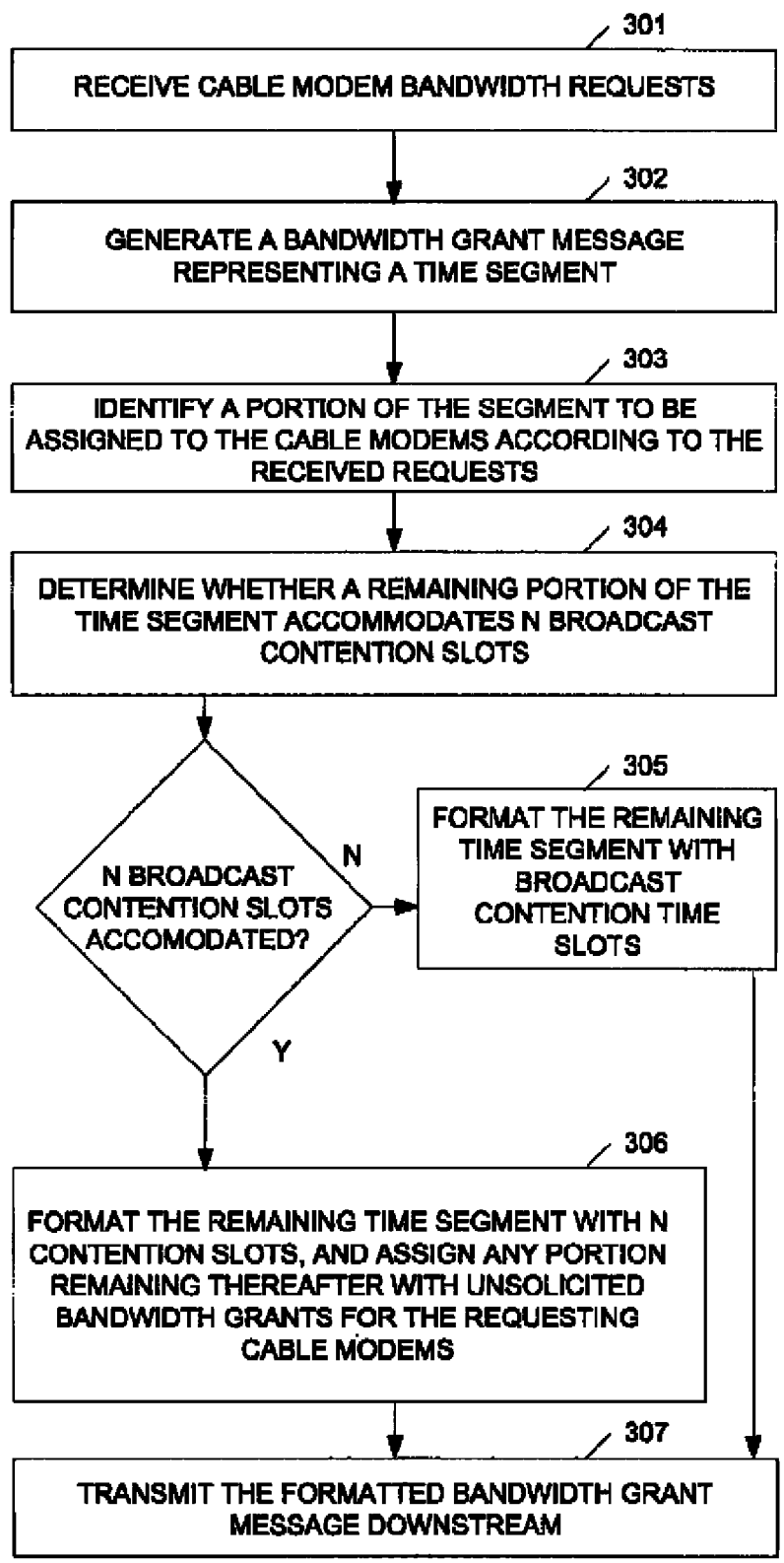
FIG. 3 illustrates an example method for using the CMTS illustrated in FIGS. 1 and 2.

FIG. 3 illustrates an example method for using the CMTS illustrated in FIGS. 1 and 2.

In block 301, the CMTS receives cable modem bandwidth requests. In block 302, the CMTS generates a bandwidth grant message representing a time segment. The CMTS identifies a portion of the time segment to be assigned to the cable modems according to the received requests in block 303.

In block 304, the CMTS determines whether a remaining portion of the time segment accommodates N broadcast contention slots. The value N may be any number such as a predefined static value, a user configurable static value, a varying number selected according to any basis such as the time of day or monitored traffic, a varying number selected according to a user-configurable range, etc. If N broadcast contention slots cannot be accommodated, in block 305 the CMTS formats the remaining segment with broadcast contention slots. If N broadcast contention slots can be accommodated, in block 306 the CMTS formats the remaining time segment with the N broadcast contention slots, and assigns any additional time segment remaining thereafter with unsolicited bandwidth grants for the requesting cable modems. The CMTS transmits the formatted bandwidth grant message downstream in block 307.

Several examples have been described above with reference to the accompanying drawings. Various other examples of the invention are also possible and practical. The system may be exemplified in many different forms and should not be construed as being limited to the examples set forth above.

The figures listed above illustrate preferred examples of the application and the operation of such examples. In the figures, the size of the boxes is not intended to represent the size of the various physical components. Where the same element appears in multiple figures, the same reference numeral is used to denote the element in all of the figures where it appears.

Only those parts of the various units are shown and described which are necessary to convey an understanding of the examples to those skilled in the art. Those parts and elements not shown may be conventional and known in the art.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. I claim all modifications and variation coming within the spirit and scope of the following claims.

The invention claimed is:

1. An apparatus, comprising:
one or more processors operable to:
generate a bandwidth grant message corresponding to a time segment;
identify a portion of the time segment to be formatted with first time slots for cable modems, the first time slots requested by received bandwidth request messages originating from the cable modems;
determine whether a remaining portion of the time segment can accommodate more than a preset number of broadcast contention slots, the broadcast contention slots providing upstream bandwidth for signaling;
if the remaining portion of the time segment can accommodate more than the preset number of broadcast contention slots, format the bandwidth grant message with an unsolicited second time slot for a selected one of the cable modems, the unsolicited time slot providing upstream bandwidth for uploading user data; and
transmit the formatted bandwidth grant message, the transmitted bandwidth grant message including both the first requested time slot for the selected cable modem and the unsolicited second time slot for the selected cable modem.

2. The apparatus of claim 1, further comprising:
a database tracking active service flows, the database indicating a history of bandwidth request messages received for the tracked service flows;
wherein the one or more processors are further operable to select the cable modem for the unsolicited second time slot according to the history indicated in the database.

3. The apparatus of claim 2, wherein the processors are further operable to:
receive an input indicating one or more attributes of preferred service flows; and
determine whether to add a newly activated service flow to the database according to a comparison of the newly activated service flow to the attributes.

4. The apparatus of claim 1, wherein the processors are further operable to:
identify ones of the cable modems having consecutively-received piggyback bandwidth requests; and
select the cable modem from the identified cable modems.

5. The apparatus of claim 1, wherein the processors are further operable to:
identify ones of the received bandwidth request messages that are transmitted in a payload of a non-bandwidth-request packet; and
select the cable modem from ones of the cable modems that correspond to the identified bandwidth request messages.

6. The apparatus of claim 1, wherein the apparatus is a cable modem termination system and the preset number is based on a value taken from a user configuration of the cable modem termination system.

7. A method, comprising:
generating a bandwidth grant message corresponding to a time segment;
identifying a portion of the time segment to be formatted with first time slots for cable modems, the first time slots requested by received bandwidth request messages originating from the cable modems;
determining whether a remaining portion of the time segment can accommodate more than a preset number of broadcast contention slots, the broadcast contention slots providing upstream bandwidth for signaling;
formatting the bandwidth grant message with an unsolicited second time slot for a selected one of the cable modems if the remaining portion of the time segment can accommodate more than the preset number of broadcast contention slots, the unsolicited second time slot providing upstream bandwidth for uploading user data; and
transmitting the formatted bandwidth grant message.

8. The method of claim 7, wherein the transmitted bandwidth grant message includes the first time slots assigned according to the received bandwidth request messages, the unsolicited second time slot, and the preset number of broadcast contention slots.

9. The method of claim 7, wherein the bandwidth grant message is generated by a cable modem termination system of a Data Over Cable Service Interface Specification (DOCSIS) cable network.

10. The method of claim 7, further comprising exchanging communications with remote PHYs.

11. The method of claim 7, wherein the total amount of upstream bandwidth provided to the selected cable modem by the first and second time slots for the selected cable modem exceeds an amount of upstream bandwidth requested by the selected cable modem.

12. The method of claim 7, wherein the total amount of upstream bandwidth provided to the selected cable modem by the first and second time slots for the selected cable modem exceeds a maximum amount requestable using a single DOCSIS bandwidth MAP request.

13. The method of claim 7, further comprising:
identifying ones of the bandwidth request messages requesting a maximum amount of bandwidth; and
selecting the cable modem from a subset of the cable modems, the subset including those cable modems associated with the identified bandwidth request messages.

14. The method of claim 7, further comprising:
receiving an input identifying a service flow attribute;
when a service flow is activated, comparing the activated service flow according to the identified service flow attribute; and
determining whether to track a history of cable modem bandwidth requests for the activated service flow according to the comparison.

15. The method of claim 14, further comprising enabling additional upstream bandwidth for the activated service flow if the tracked history indicates that consecutive bandwidth requests for the activated service flow were piggybacked in non-bandwidth-request data packets.

16. The method of claim 15, further comprising disabling additional upstream bandwidth for the activated service flow responsive to receiving a non-piggybacked cable modem bandwidth request.

17. A method, comprising:
associating a plurality of cable modems associated with a Cable Modem Termination System (CMTS);
generating a tracking table with entries for at least some of the associated cable modems;
continuously inspecting bandwidth requests from the tracked cable modems to determine whether each inspected bandwidth request is a standalone bandwidth request or a piggyback bandwidth request;
updating the entries in the tracking table based on the determinations to specify a bandwidth-request-type history and, in association with the updating, dynamically enabling or disabling a bandwidth boost for each entry based on the respective bandwidth-request-type history;
receiving a current bandwidth request and comparing the received current bandwidth request to the tracking table;
generating a bandwidth grant message allocating upstream bandwidth for a time segment, the generated bandwidth grant message allocating a portion of the time segment for the received current bandwidth request; and
only if the table contains an entry corresponding to the received current bandwidth request and only if that entry is designated as currently enabled for the bandwidth boost, then checking if an additional time slot in the bandwidth grant message can be assigned to a particular one of the cable modems corresponding to the received current bandwidth request.

18. A memory device encoded with instructions that, if executed, result in operations comprising:
continuously inspecting bandwidth requests from cable modems to determine whether each inspected bandwidth request is a standalone bandwidth request or a piggyback bandwidth request;
generating a tracking table with entries for the cable modems, each entry specifying, based on the determinations, a bandwidth-request-type history for a corresponding one of the cable modems;
generating a bandwidth grant message allocating upstream bandwidth for a time segment, the generated bandwidth grant message allocating a portion of the time segment for a currently received bandwidth request;
comparing the currently received bandwidth request to the entries in the table; and
based on a result of the comparison, checking if an additional time slot in the bandwidth grant message can be assigned to the cable modem corresponding to the currently received bandwidth request.

19. The memory device of claim 18, wherein at least one of the entries in the table includes a bandwidth boost field to be dynamically enabled or disabled according to the tracked bandwidth-request-type history of the corresponding cable modem.

\* \* \* \* \*